United States Patent [19]

Kubota

[11] 4,233,637
[45] Nov. 11, 1980

[54] ROTATING MAGNETIC HEAD PIEZO-ELECTRIC ASSEMBLY AND DRIVE CIRCUITRY FOR VIDEO TAPE RECORDER

[75] Inventor: Yukio Kubota, Tokyo, Japan

[73] Assignee: Sony Corporation, Tokyo, Japan

[21] Appl. No.: 3,974

[22] Filed: Jan. 16, 1979

[30] Foreign Application Priority Data

Jan. 17, 1978 [JP] Japan .................................. 53-2710

[51] Int. Cl.³ ....................... G11B 21/10; G11B 21/18
[52] U.S. Cl. ..................................... 360/10; 310/331; 310/332; 360/70; 360/77; 360/109
[58] Field of Search ....................... 360/10, 11, 33, 70, 360/75, 76, 77, 78, 106, 107, 108, 109, 113; 179/100.41 P; 310/317, 326, 327, 330, 331, 332, 368, 370, 26

[56] References Cited

U.S. PATENT DOCUMENTS

| | | | |
|---|---|---|---|
| 2,478,223 | 8/1949 | Argabrite | 179/100.41 P |
| 3,247,404 | 4/1966 | Batsch | 179/100.41 P |
| 3,821,787 | 6/1974 | Kihara | 360/33 X |
| 4,080,636 | 3/1978 | Ravizza | 360/77 |
| 4,099,211 | 7/1978 | Hathaway | 360/109 |
| 4,143,405 | 3/1979 | Kubota | 360/10 |

Primary Examiner—Robert S. Tupper
Assistant Examiner—Donald E. McElheny, Jr.
Attorney, Agent, or Firm—Lewis H. Eslinger; Alvin Sinderbrand

[57] ABSTRACT

A magnetic head assembly for a video tape recorder includes a piezo-electric support, preferably constituted by a bi-morph leaf or leaves, supported at one end, for example, on a rotary portion of a tape guide drum, and a magnetic head mounted at the other end of the piezo-electric support, and the piezo-electric support has two pairs of first and second electrodes secured on opposed major surfaces, respectively, of the support and extending in the direction between the ends of the support, that is, in the lengthwise direction of the latter, with such pairs of electrodes being parallel and spaced from each other in the direction across the support. Thus, by applying suitable control voltages between the first and second electrodes of the two pairs thereof, the piezo-electric support can be made to flex or bend longitudinally and/or torsionally, for example, for correcting tracking erros and/or for varying the azimuth angle, respectively, of the mounted head.

12 Claims, 18 Drawing Figures

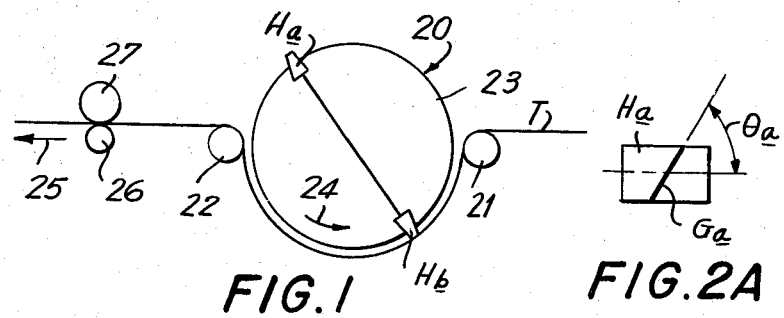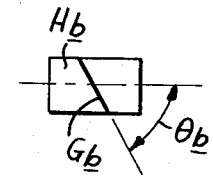
FIG.1  FIG.2A  FIG.2B
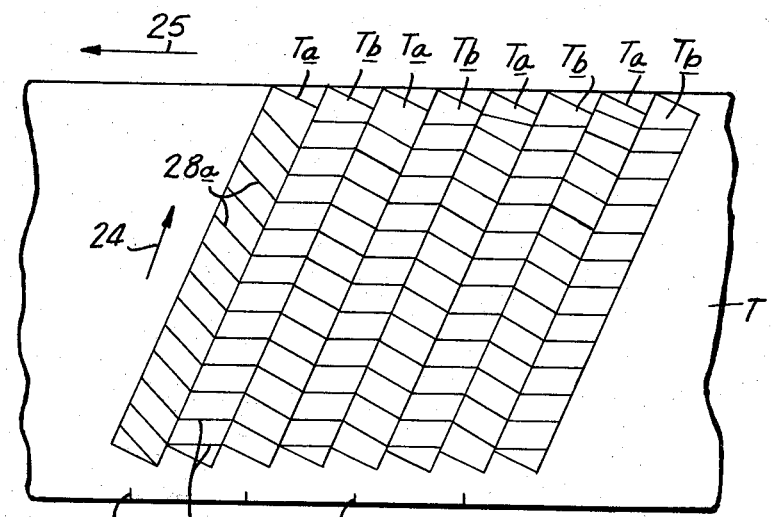
FIG.3
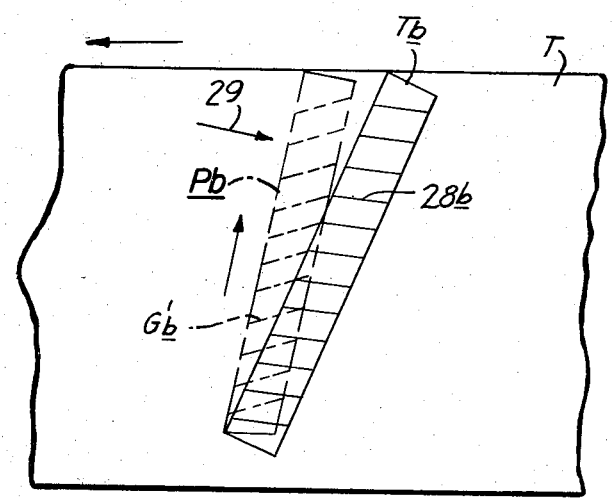
FIG.4

ROTATING MAGNETIC HEAD PIEZO-ELECTRIC ASSEMBLY AND DRIVE CIRCUITRY FOR VIDEO TAPE RECORDER

BACKGROUND OF THE INVENTION

1. Field of the Invention

This invention generally relates to apparatus of the type wherein signal information is recorded in parallel skewed tracks on a record medium and has particular application to a video tape recorder (VTR) in which stop-motion, slow-motion or fast-motion pictures as well as normal-motion pictures can be reproduced.

2. Description of the Prior Art

In a conventional VTR, a rotary transducer or head assembly is provided with one or more magnetic transducers which scan successive parallel tracks on a magnetic record tape so as to record and/or reproduce video signals in such tracks. In general, while the one or more transducers rotate so as to scan across the tape, the tape itself is transported longitudinally. A typical so-called helical scan VTR preferably includes two record and/or playback transducers mounted approximately 180° apart on a suitable rotary assembly so as to alternately scan a magnetic tape which is helically wrapped about at least a portion of a guide drum forming a part of the transducer assembly. During recording, a tracking servo system controls the rotation of the transducers with respect to the tape movement, and control pulse signals are recorded on a marginal portion of the tape. During normal reproduction, the same or a similar servo control system is used to synchronize the movement of the tape to the rotation of the transducers in accordance with the recorded control pulse signals. Consequently, an accurate video picture can be displayed in response to the reproduced video signal. This accuracy is, in large part, due to the fact that the servo control system tends to control the relative movements and positions of the rotary transducers and the tape so that each transducer scans substantially the same track during a reproducing or playback operation as was scanned by it during the recording operation. Therefore, during normal reproducing, that is, playback at the normal tape speed, the servo system substantially serves to insure that the scanning path of each of the heads or transducers coincides with one of the previously recorded tracks. In one type of helical scan VTR, the adjacent parallel record tracks which are recorded by the alternate passes or scans of the magnetic heads or transducers are spaced apart from each other by guard bands. In another type of helical scan VTR, the recording density is increased by eliminating such guard bands and recording the parallel record tracks in abutting or substantially contiguous relation.

In existing helical scan VTRs wherein contiguous record tracks are recorded, the problem of crosstalk interference due to unwanted signals which are picked up from adjacent record tracks during a reproducing operation is avoided, at least in respect to high frequency signal components, by recording the adjacent record tracks with magnetic heads having respective gaps with different azimuth angles. As is known, if the luminance signal of a composite color video signal is frequency-modulated onto a relatively higher frequency carrier, then, because of the phenomenon of azimuth loss which is directly related to the frequency of the signals, those signals which are recorded in an adjacent track by a magnetic head having a different azimuth angle than the head which is used to reproduce the recorded signals from a given track will be substantially attenuated. Of course, the magnetic head used for reproducing signals recorded in each track should have the same azimuth angle as the head which was used to record the signals in that track.

However, it is bothersome and costly to provide the rotary transducer assembly of a VTR with heads having different azimuth angles and further to precisely position such heads relative to the supporting structures therefor so that the desired coincidence of the azimuth angles of heads used for recording and reproducing signals in particular tracks will be achieved even when the recording and reproducing operations are performed with different VTRs.

Recently, VTRs have been provided which are capable of various kinds of reproducing operations, such as "stop or still-motion", "slow-motion" and "quick or fast-motion". In these various reproducing modes, the tape speed differs from the speed during recording. Consequently, the scanning path of each head or transducer is different from the recorded track during these different reproducing modes, that is, the scanning path is inclined, or angularly disposed, with respect to the recorded track. This means that, in the various reproducing modes other than the "normal mode", guard band noise or crosstalk will result from the tracking errors or inclination of the scanning paths of the heads relative to the recorded tracks.

It has been proposed, for example, in U.S. Pat. No. 4,080,636, that such tracking errors in the scanning path of each rotary head or transducer can be corrected if each transducer is supported by an adjustable support assembly, such as, a so-called bi-morph leaf, which is adapted to deflect or flex in a direction, and by an amount depending upon the polarity and amplitude of an electrical drive signal applied thereacross. Hence, and as described in the aforementioned patent, the drive signal applied to the bi-morph leaf can be suitably controlled so as to deflect the transducer supported thereby in a direction transversely of the plane of rotation of the head or transducer and thereby cause its scanning path to coincide with the parallel record tracks which are scanned thereby. Although tracking errors are minimized or avoided by use of a suitably controlled bi-morph leaf, as aforesaid, it can be appreciated that deflection of the transducer or head in the direction transverse or perpendicular to its plane of rotation does not alter the azimuth angle of the head gap relative to the track being scanned. Thus, if the tracking error or deviation of the scanning path from a recorded track is accompanied by a difference between the actual azimuth angle of the scanning transducer or head from the azimuth angle with which the scanned track was recorded, the resulting azimuth loss or attenuation of the reproduced signal will not be substantially helped by the bi-morph leaf induced deflection of the head perpendicular to its plane of rotation.

Moreover, if a helical scan VTR having two diametrically opposed heads with different azimuth angles for minimizing crosstalk interference, as described above, is used in a "slow-motion" reproducing operation in which, for example, the tape is longitudinally driven or advanced at a speed which is one-half or one-quarter the tape speed during recording, each recorded track is scanned twice or four times, respectively, and, therefore, half of such repeated scans of each track may be effected with a head having an azimuth angle different from that of the head with which the scanned track was recorded. Accordingly, in the slow-motion reproducing mode, there may be substantial attenuation of the reproduced signal during at least some of the repetitive scans of each track.

OBJECTS AND SUMMARY OF THE INVENTION

Accordingly, it is an object of this invention to provide a mounting for a transducer or head, for example, as in a helical scan VTR, by which the azimuth angle of the head can be conveniently varied or adjusted in response to suitable electrical signals.

Another object is to provide a mounting for a magnetic transducer or head, as aforesaid, by which the mounted head can be conveniently deflected in a direction transverse to its scanning path while the azimuth angle of the head is also simultaneously adjusted or varied in response to suitable electrical signals.

Still another object is to provide a magnetic recording and/or reproducing apparatus, for example, in the form of a VTR, in which video or other information signals are recorded in successive parallel tracks which are skewed relative to the direction of travel of the record medium or tape with the magnetic domains of the signals recorded in adjacent tracks being arranged at different angles to the directions along the tracks, for example, by recording in adjacent tracks with heads having correspondingly different azimuth angles, and in which slow-motion reproducing of the signals thus recorded can be effected without attenuation due to azimuth loss.

More particularly, it is another object of this invention to provide a recording and/or reproducing apparatus or VTR, as aforesaid, in which, during slow-motion reproducing by means of driving of the tape at a reduced speed and resulting repeated scanning of the record tracks, each head, in scanning a track, has its azimuth angle electrically controlled so as to correspond to the azimuth angle of the head with which signals were recorded in such track.

In accordance with an aspect of this invention, a magnetic head assembly for a video tape recorder or the like includes a piezo-electric support, preferably constituted by a bi-morph leaf or leaves, supported at one end, for example, on a rotary portion of a tape guide drum, while a magnetic head is mounted at the other end of the piezo-electric support, and two pairs of first and second electrodes secured on opposed major surfaces, respectively, of the piezo-electric support and extending in the lengthwise direction of the latter, with the pairs of electrodes being parallel and spaced from each other in the direction transverse to such lengthwise direction.

In accordance with another aspect of this invention, a drive circuit is provided for applying selectively varied voltages across the first and second electrodes of the pairs of electrodes and by which the piezo-electric support is selectively made to flex for deflecting the respective magnetic head in a direction substantially normal to the usual plane of the plate-like piezo-electric support and for varying the azimuth angle of the head mounted thereon.

In a preferred embodiment of the invention, the drive circuit includes means connecting the first electrode of one of the pairs and the second electrode of the other pair to ground, a source of a variable control voltage, an inverter or other means for providing a reversed polarity replica of the variable control voltage, means for providing the variable control voltage and the reversed polarity replica thereof with a selectively varied D.C. voltage bias, and means for applying the variable control voltage with the D.C. voltage bias and the reversed polarity replica with the D.C. voltage bias to the second and first electrodes, respectively, of said one pair and said other pair, respectively, of the electrodes.

The above, and other objects, features and advantages of the invention, will be apparent in the following detailed description of illustrative embodiments thereof which is to be read in connection with the accompanying drawings.

BRIEF DESCRIPTION OF THE DRAWINGS

FIG. 1 is a schematic plan view of a portion of a helical scan VTR in which the present invention can be advantageously employed;

FIGS. 2A and 2B are greatly enlarged elevational views of the operative faces of two magnetic heads having gaps with different azimuth angles, as commonly used in the VTR of FIG. 1;

FIG. 3 is a schelatic view of a section of a magnetic tape on which video or other information signals have been recorded in successive parallel tracks by means of the VTR of FIG. 1;

FIG. 4 is a schematic view showing one of the record tracks appearing on FIG. 3 and illustrating the angular deviation therefrom of the scanning path of a head of the VTR during a slow-motion reproducing operation;

DETAILED DESCRIPTION OF THE PREFERRED EMBODIMENTS

Figure 5:
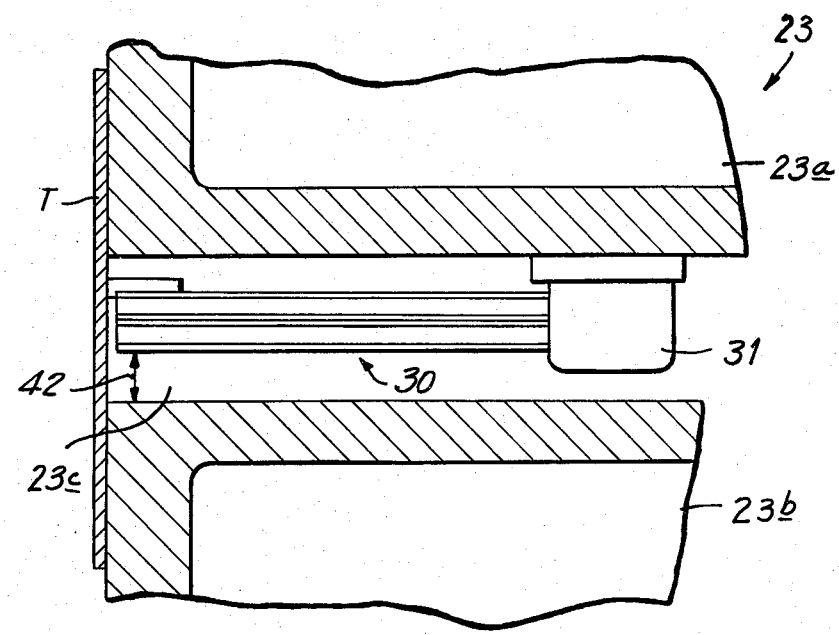
FIG. 5 is an enlarged side elevational view of a magnetic head assembly according to an embodiment of this invention, and which is shown associated with a portion of a guide drum which may be part of the VTR of FIG. 1.

For the purpose of simplification, and to facilitate understanding of the present invention, the latter is hereinafter described in detail in its application to an apparatus for recording and/or reproducing video signals, such as, a video tape recorder (VTR). However, the problems to which the invention is addressed, and the solution of those problems, as disclosed herein, are not limited to video signal recording and/or reproducing apparatus. Hence, it will be understood that the invention is similarly applicable to other types of analog or digital signal recording devices.

Referring first to FIG. 1, it will be seen that a typical rotary head scanning device 20, for example, as used in a video tape recorder (VTR), includes two magnetic record/playback transducers or heads $H_a$ and $H_b$ adapted to rotate about an axis disposed centrally therebetween. A record medium in the form of a magnetic tape T is guided, as by rollers 21 and 22, to extend helically about at least a 180° angular extent of the periphery of a tape guide drum 23 with which heads $H_a$ and $H_b$ are associated so as to scan successive, parallel skewed tracks across tape T. More particularly, as heads $H_a$ and $H_b$, shown to be substantially diametrically opposed, are rotated in the direction of the arrow 24 on FIG. 1, tape T is advanced or made to travel longitudinally in the direction of the arrow 25, for example, by the cooperative action of a rotated capstan 26 and pinch roller 27 between which the tape is engaged, so that heads $H_a$ and $H_b$ alternately scan and record information signals in alternately arranged parallel tracks $T_a$ and $T_b$, respectively, which are skewed relative to the longitudinal direction or direction of travel of the tape, as shown on FIG. 3.

During a signal recording operation and during a "normal" signal reproducing operation, the speed with which the tape is driven in the longitudinal direction is the same, and a suitable servo control circuitry (not shown) is usually provided to account for relatively small changes in the speeds at which the rotary heads and the tape are driven, and for tape stretching or shrinkage, differences from one apparatus to another, and the like. In a typical video recording apparatus, each of the heads $H_a$ and $H_b$ records a complete field of video signal information in the respective record track $T_a$ or $T_b$ scanned thereby and, for such purpose, heads $H_a$ and $H_b$ are rotated at a speed of 30 r.p.s.

However, the video signal recording and/or reproducing apparatus or VTR desirably has both the normal reproducing and a "non-normal" reproducing mode. As noted above, in the normal reproducing mode, the record medium or tape T is advanced at the same speed during the reproducing operation as during the earlier recording operation so that, by means of the conventional servo control circuitry (not shown), the heads $H_a$ and $H_b$ may be made to alternately scan the record tracks $T_a$ and $T_b$, respectively, for accurately reproducing the video signal information recorded therein. However, in the "non-normal" reproducing mode, the heads $H_a$ and $H_b$ continue to be rotated at the same speed as during recording, but the speed of advancement of the tape T is changed. Thus, in a non-normal or "slow-motion" reproducing mode, the record medium or tape T is advanced at a fraction of its normal speed with the result that heads or transducers $H_a$ and $H_b$ scan substantially the same track a number of times. A common problem in the slow-motion reproducing mode is that the scanning path traversed by each of the heads $H_a$ and $H_b$ no longer exactly coincides with a previously recorded record track. Rather, the scanning path is inclined, or angularly disposed, with respect to the recorded track. For example, as shown on FIG. 4, in the case of the slow-motion reproducing mode, the scanning path of the head $H_b$, indicated in broken lines at $P_b$, is inclined in respect to a track $T_b$ that was recorded by such head. This, of course, is due to the change in the relative speed of movement of the record medium or tape T with respect to the scanning heads $H_a$ and $H_b$ during the non-normal reproducing operation as compared with the normal reproducing or recording operation. Because of the illustrated inclination or angular disposition of the scanning path $P_b$ in respect to the record track $T_b$, the head $H_b$, as it deviates from record track $T_b$, will pick up noise from guard bands separating successive record tracks or head $H_b$ will pick up cross-talk from adjacent track $T_a$ in the case where the successive record tracks $T_a$ and $T_b$ are recorded without guard bands therebetween, as on FIG. 3, for maximum utilization of the tape T.

Even during a normal reproducing operation with heads $H_a$ and $H_b$ properly scanning tracks $T_a$ and $T_b$ alternately in succession, each head $H_a$ or $H_b$, when scanning a track $T_a$ or $T_b$, respectively, may pick up signals or cross-talk from an adjacent track $T_b$ or $T_a$, respectively, particularly if the tracks are recorded without guard bands therebetween. In order to minimize such cross-talk, it has been the usual practice to provide transducers $H_a$ and $H_b$ used for alternately recording in tracks $T_a$ and $T_b$, respectively, with air gaps $G_a$ and $G_b$ having different azimuth angles $\theta_a$ and $\theta_b$, respectively, as shown particularly on FIGS. 2A and 2B. Each of heads $H_a$ and $H_b$ has a finite width and produces magnetization of magnetic domains in the material on tape T in which would appear to be, if such domains were visible, a series of parallel lines or stripes each having a length as great as the width of the track, and each having an orientation that corresponds to the azimuth angle of the gap of the transducer or head recording in that track. By recording the successive alternate tracks $T_a$ and $T_b$ with the transducers or heads $H_a$ and $H_b$ having different azimuth angles, and by reproducing the signals recorded in the tracks $T_a$ and $T_b$ by means of the reproducing transducers or heads $H_a$ and $H_b$ having the corresponding azimuth angles, the gap of each reproducing transducer or head will be aligned with the parallel, but fictitious, lines of the track being scanned thereby. However, because of the difference in the azimuth angles of the heads with which the adjacent tracks $T_a$ and $T_b$ are recorded, the gap of the transducer or head $H_a$ or $H_b$, when reproducing the signals recorded in the track $T_a$ or $T_b$, respectively, would extend at an angle to the orientations of the fictitious lines or magnetic domains in the next adjacent track $T_b$ or $T_a$, respectively. Thus, if the reproducing transducer or head $H_a$ or $H_b$, when accurately scanning a track $T_a$ or $T_b$ recorded with the same azimuth angle, is still influenced by the signals recorded in adjacent tracks $T_b$ or $T_a$ with different azimuth angles, a so-called azimuth loss will decrease or eliminate the effect of such signals recorded in the adjacent tracks on the output signal of the reproducing transducer.

As shown particularly on FIG. 4, if the scanning path of a reproducing head, for example, the illustrated scanning path $P_b$ of reproducing head $H_b$, deviates or is angularly displaced from a track $T_b$ in which signals have been recorded earlier by the same head $H_b$, for example, as during a slow-motion reproducing operation, the gap of head $H_b$ moving along scanning path $P_b$ will have an orientation, as indicated by the broken lines $G'_b$, which is at an angle in respect to the magnetic domains of the signals recorded in track $T_b$. If each of the heads $H_a$ and $H_b$ is mounted on an adjustable support, such as, a so-called bi-morph leaf, which is adapted to deflect in a direction perpendicular or transverse to the scanning path of the respective head in response to an electrical drive signal applied across the bi-morph leaf, for example, as suggested in U.S. Pat. No. 4,080,636, the amplitude and polarity of such electrical drive signal can be suitably controlled so as to provide a varying deflection of the head as the latter moves along its scanning path so as to cause the scanning path of the head to coincide with the record track being scanned by the latter. Although the foregoing minimizes or avoids tracking errors in the slow-motion reproducing mode, it will be appreciated that deflection of the transducer or head in the direction transverse to its scanning path, that is, perpendicular to its plane or rotation, as indicated by the arrow 29 on FIG. 4, does not alter the azimuth angle of the head gap relative to the track being scanned. Thus, if the tracking error or deviation of the scanning path $P_b$ from the record track $T_b$ is accompanied by a difference between the azimuth angle of the gap $G'_b$ of the scanning head $H_b$ from the azimuth angle with which the scanned track $T_b$ was recorded, the resulting azimuth loss or attenuation of the reproduced signal will not be substantially helped by deflection of the head perpendicular to its plane of rotation for eliminating the tracking error.

Furthermore, if a helical scan VTR having the two diametrically opposed heads $H_a$ and $H_b$ with different azimuth angles $\theta_a$ and $\theta_b$ for minimizing cross-talk interference in its normal reproducing mode, as described above, is used in a slow-motion reproducing mode in which, for example, the tape is longitudinally driven or advanced at a fraction of its normal speed so that each track $T_a$ or $T_b$ having signals recorded therein by the head $H_a$ or $H_b$ is repetitively scanned by the heads $H_a$ and $H_b$, then it will be appreciated that at least certain of the repeated scans of a track will be effected with a head having an azimuth angle different from that of the head with which the scanned track was recorded. Accordingly, in such slow-motion reproducing mode, substantial attenuation of the reproduced signal will be experienced during at least some of the repetitive scans of the tracks.

Generally, in accordance with this invention, the above-described problems are avoided by providing each magnetic head with a head support member which is adapted to be electrically controllable both for deflecting the respective head in the direction transverse or perpendicular to its scanning path, and for changing the azimuth angle of the head gap relative to the lengthwise direction of the scanning path.

More particularly, and as shown on FIG. 5, in a helical-scan VTR according to an embodiment of this invention, tape guide drum 23 includes a rotatable upper drum portion 23a and a stationary lower drum portion 23b with a radially opening circumferential slit 23c defined between drum portions 23a and 23b, and a piezoelectric support member 30 is provided for each magnetic head H and is fixed at its base or inner end portion to the bottom of rotatable drum portion 23a, for example, by means of a mounting bracket 31. The piezo-electric support member 30 is longitudinally dimensioned so that, when mounted in the foregoing manner, in respect to rotary drum portion 23a, the respective magnetic head H, in the form of a chip mounted at the free or outer end of the support member, extends through slit 23c for engagement with the magnetic tape T wrapped helically, that is, at an angle to the plane of slit 23c, about a substantial portion of the periphery of drum 23.

Figure 6:
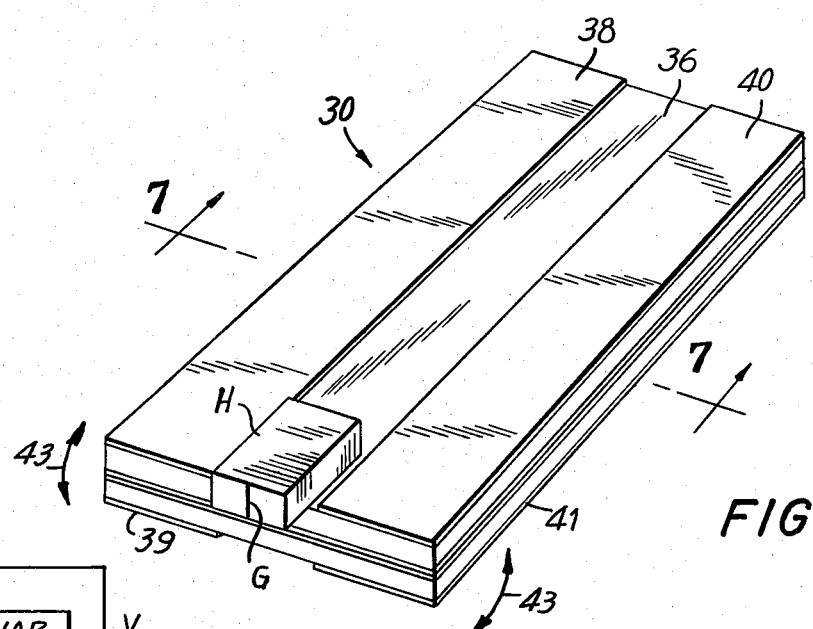
FIG. 6 is an enlarged perspective view of the magnetic head assembly of FIG. 5.
Figure 7:
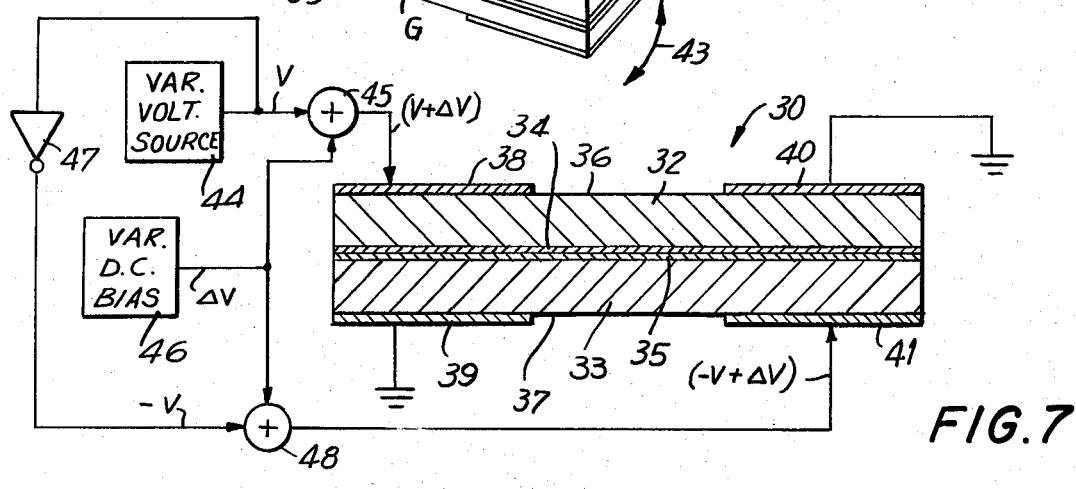
FIG. 7 is an enlarged sectional view taken along the line 7—7 on FIG. 6, and further diagrammatically illustrating a drive circuit that may be used for determining the positioning of the mounted magnetic head.

As shown on FIGS. 5–7, support member 30 is composed of a pair of piezo-electric or piezo-ceramic plates 32 and 33 which are generally elongated and provided, on their confronting surfaces, with inner electrodes 34 and 35, respectively, which are suitably bonded to each other. Such secured together plates 32 and 33 have opposed major surfaces 36 and 37, respectively, and pairs of first and second electrodes 38 and 39 and of first and second electrodes 40 and 41 are secured on the opposed major surfaces 36 and 37, respectively. As shown, the pairs of first electrodes 38 and 40 and second electrodes 39 and 41 extend in the lengthwise direction of the piezo-electric support member 30, with the pair of electrodes 38 and 39 being parallel to, and spaced from the pair of electrodes 40 and 41 in the direction transverse to the lengthwise direction.

It will be appreciated that support member 30, as described above with reference to FIGS. 5–7, constitutes a so-called bi-morph leaf which, in response to the application of selectively varied voltages between first and second electrodes 38 and 39 and between first and second electrodes 40 and 41, may be made to flex or bend longitudinally and also torsionally about its longitudinal median. Thus, with the support member or bi-morph leaf 30 fixedly secured at its inner end, as at 31, to the underside of rotary drum portion 23a, and with the respective magnetic head H mounted at the outer end of support member 30 so as to project through slit 23c, the longitudinal bending or flexing of member 30 will be effective to deflect head H transverse to the direction along its scanning path, as indicated by the arrows 42 on FIG. 5, whereas torsional flexing of member 30 will be effective to angularly displace the outer or free end of member 30, as indicated by the arrows 43 on FIG. 6, and thereby change the azimuth angle of the gap G of head H relative to the direction along the scanning path of the latter. It will be appreciated that deflection of head H in the direction of arrows 42 on FIG. 5, that is, transverse to the direction along its scanning path, results from potential differences of the same polarity between electrodes 38 and 39 and electrodes 40 and 41, whereas changes in the azimuth angle of head H result from variations of the relative amplitudes of the potential differences between the electrodes 38 and 39 and the electrodes 40 and 41, or changes in the relative polarities of such potential differences.

Referring in detail to FIG. 7, it will be seen that, in a simplified drive circuit for controlling the flexing movements of bi-morph leaf 30 according to this invention, the second electrode 39 and 40 are connected to ground, while the remaining electrodes 38 and 41 respectively have applied thereto a variable control voltage V provided with a selectively varied D.C. voltage bias $\Delta V$ and a reversed polarity replica $-V$ of the variable control voltage V again provided with the selectively varied D.C. voltage bias $\Delta V$. More particularly, in the simplified drive circuit of FIG. 7, there are provided a source 44 of the variable control voltage V which is applied directly to a first input of an adder 45. Adder 45 has a second input receiving the selectively varied D.C. voltage bias $\Delta V$ from a source 46 of the latter. Thus, adder 45 provides, at its output, the control voltage $(V+\Delta V)$, that is, the variable control voltage from source 44 with the D.C. voltage bias from source 46, and which is applied to electrode 38. The variable control voltage V from source 44 is further shown to be applied to an inverter 47 so as to provide the reversed polarity replica $-V$ which is applied to a first input of an adder 48 having a second input to which the selectively varied D.C. voltage bias $\Delta V$ is applied from source 46. Thus, the output $(-V+\Delta V)$ of adder 48 is constituted by the reversed polarity replica of the variable control voltage with the D.C. voltage bias and is applied to electrode 41.

Figure 8:
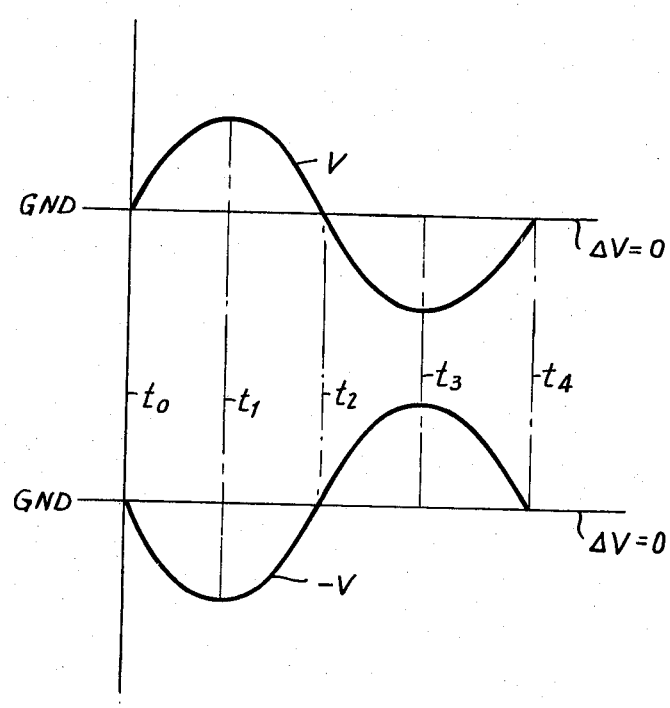
FIG. 8 is a graphical representation of control voltages that may be applied to a piezo-electric support of the magnetic head assembly of FIGS. 5–7 for determining the position of the magnetic head mounted thereon.
Figure 9:
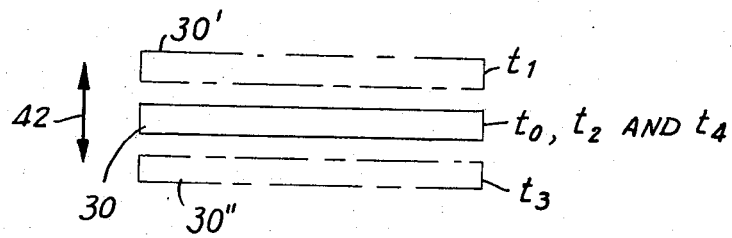
FIG. 9 is a diagrammatic illustration of the displacements of the piezo-electric support, at the end thereof on which the head is mounted, as a result of the application thereto of the control voltages of FIG. 5.

If it is assumed, merely for the purposes of illustration, that the D.C. voltage bias $\Delta V$ is zero, and further that the control voltage V and its reversed polarity replica $-V$ vary sinusoidally with time, as shown on FIG. 8, then the bi-morph leaf 30 will merely flex longitudinally for deflecting its free end and the head thereon in the direction of the arrows 42 on FIG. 9 and no torsional flexing of the bi-morph leaf will occur. More particularly, at the times $t_0$, $t_2$ and $t_4$, when the control voltages $(V+\Delta V)$ and $(-V+\Delta V)$ applied to electrodes 38 and 41, respectively, are equal to the ground potential GND applied to electrodes 39 and 40, there is no flexing or bending of bi-morph leaf 30 and the free end of the latter remains in its initial or rest position, as indicated in full lines at 30 on FIG. 9. However, at the time $t_1$, the control voltage $(V+\Delta V)$ applied to electrode 38 is greater than the ground potential GND applied to electrode 39 by the same amount that the ground potential applied to electrode 40 is greater than the control voltage $(-V+\Delta V)$ applied to electrode 41 with the result that piezo-ceramic plate 32 contracts the piezo-ceramic plate 33 expands so as to deflect the free end portion of bi-morph leaf 30 in the upward direction to the position indicated in broken lines at 30' on FIG. 9. On the other hand, at the time $t_3$, the control voltage applied to electrode 38 is lower than the ground potential applied to the electrode 39 by the same amount that the ground potential applied to electrode 40 is lower than the control voltage applied to the electrode 41, with the result that the bi-morph leaf is flexed or bent downwardly, for esample, so as to dispose its free end at the position indicated in broken lines at 30" on FIG. 9.

It will be apparent from the foregoing that, with the drive circuit shown on FIG. 7, the amplitude and polarity of the variable control voltage V from source 44 and of the reversed polarity replica $-V$ thereof determine the extent and direction of the deflection of head H in the vertical direction, that is, generally transverse to the direction along its scanning path. On the other hand, reference to FIGS. 10 and 11 will show that the amplitude and polarity of the selectively varied D.C. voltage bias $\Delta V$ determine the extent and direction of angular displacement or twisting of the free end portion of the bi-morph leaf 30 from its rest position, and hence the change in the azimuth angle of the mounted head in respect to the direction along the scanning path thereof. More particularly, in the case where the variable control voltage V and its reversed polarity replica $-V$ are again assumed, merely for the purposes of illustration, to vary sinusoidally about the D.C. bias level $\Delta V$ and have a maximum variation or swing equal to the amplitude of such D.C. bias, it will be seen that, at each of the times $t_0$, $t_2$ and $t_4$, the voltages applied to the electrodes 38 and 41 will be greater than the ground potential applied to the electrodes 39 and 40 by the finite value $\Delta V$ of the D.C. voltage bias with the result that the bi-morph leaf 30 will only twist about its longitudinal median, as indicated by the arrow 43, so as to angularly displace its free end, and the head mounted thereon, to the position shown in full lines at 30 on FIG. 11. On the other hand, at the time $t_1$ on FIG. 10, the voltage applied to electrode 38 will be higher than the ground potential applied to electrode 39 by the maximum value of $(V+\Delta V)$, while the voltage applied to electrode 41 will be equal to the ground potential applied to electrode 40. The resultant flexing of the bi-morph leaf 30 will cause its free end to assume the position indicated in broken lines at 30' on FIG. 11 and which represents, relative to the rest position, an upward displacement, in the direction of the arrows 42, together with an angular displacement similar to that indicated at 30 on FIG. 11. Finally, at the time $t_3$ on FIG. 10, the control voltage applied to electrode 38 will be equal to the ground potential applied to electrode 39, and the control voltage applied to electrode 41 will be greater than the ground potential applied to electrode 40 by the maximum amount of the voltage $(-V+\Delta V)$. Thus, at the time $t_3$ on FIG. 10, the free end of the bi-morph leaf will be displaced to the position indicated in broken lines at 30" on FIG. 11 which is displaced downwardly from, and parallel to the position of the free end of the bi-morph leaf indicated in full lines at 30 on FIG. 11.

Figure 10:
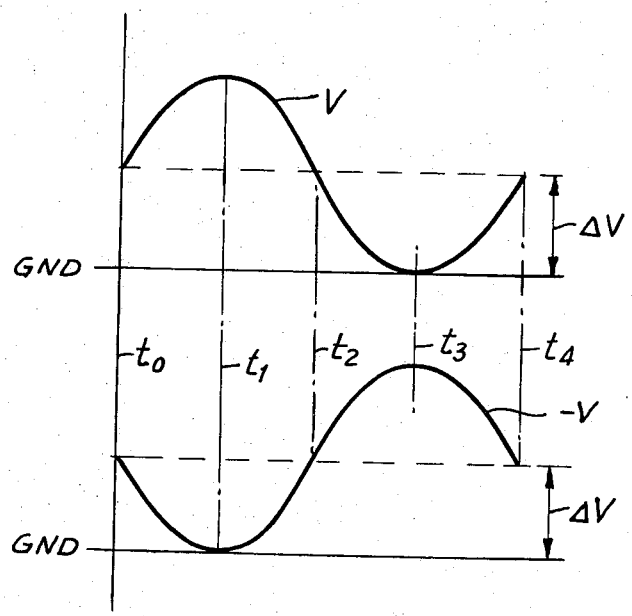
FIG. 10 is a graphical representation similar to that of FIG. 8, but showing other control voltages that may be applied to the piezo-electric support of a magnetic head assembly according to this invention.
Figure 11:
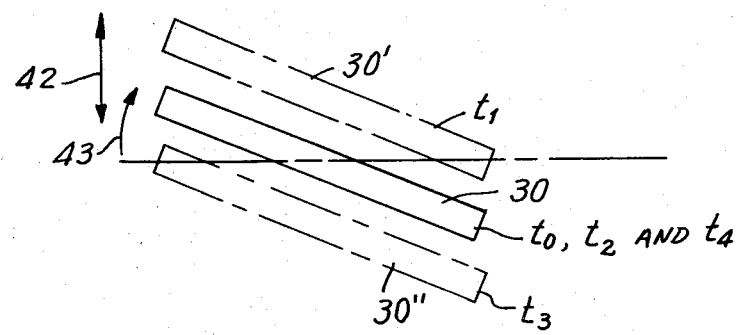
FIG. 11 is a diagrammatic illustration similar to that of FIG. 9, but showing the displacements of the head end of the piezo-electric support upon application thereto of the control voltages of FIG. 10.

Although not shown, it will be appreciated that, if the D.C. voltage bias $\Delta V$ is increased or decreased from the value illustrated on FIG. 10, the inclination of the free end of the bi-morph from the horizontal in each of the positions shown on FIG. 11 would be correspondingly increased or decreased, respectively. Further, if the D.C. voltage bias is given a negative value $(-\Delta V)$ rather than the positive value $(\Delta V)$ shown on FIG. 10, the free end of the bi-morph leaf would be inclined relative to the horizontal in the direction opposite to that shown on FIG. 11. Thus, the magnetic head H mounted on the bi-morph leaf 30 in accordance with the present invention can be deflected vertically, that is, in the direction generally transverse to the direction along a record track being scanned thereby, and the magnetic head can be simultaneously angularly adjusted or deflected for varying its azimuth angle merely by suitably controlling the voltages applied to electrodes 38 and 41.

By reason of the foregoing, and as shown particularly on FIG. 6, the head H may be formed with its gap G substantially at right angles to the plane of bi-morph leaf 30 in the rest condition of the latter and, thereafter, the desired azimuth angle of the head H can be achieved merely by suitably adjusting or varying the voltages applied to electrodes 38 and 41. Thus, for example, in the case of a two-headed, helical scan recording and/or reproducing apparatus or VTR, the present invention can be employed to ensure that, in the recording operation thereof, the alternating adjacent tracks $T_a$ and $T_b$ have signals recorded therein by means of magnetic heads with different effective azimuth angles for minimizing cross-talk during normal reproducing operations, as previously described with reference to FIG. 3. In the case of a VTR according to this invention, and as shown in detail on FIG. 12, the two diametrically opposite magnetic heads $H_a$ and $H_b$ supported by piezo-electric support members 30a and 30b, respectively, according to this invention, may have their gaps $G_a$ and $G_b$ simply arranged substantially at right angles to the planes of the respective bi-morph leaves in the rest or non-deflected portions of the latter. In such case, the desired different azimuth angles of heads $H_a$ and $H_b$ during recording operation are obtained by applying suitable control voltages to electrodes 39a and 40a and to electrodes 39b and 40b by which support members 30a and 30b are made to flex torsionally in opposite directions about their respective longitudinal medians. For example, equal voltages of positive polarity relative to ground potential may be applied to electrodes 39a and 40a to cause angular displacement of the free end of bi-morph leaf 30a in one direction from the position shown on FIG. 12, while equal voltages of negative polarity relative to ground potential are applied to electrodes 39b and 40b to cause angular displacement of the free end of bi-morph leaf 30b in the opposite direction from the illustrated position.

Figure 13A:
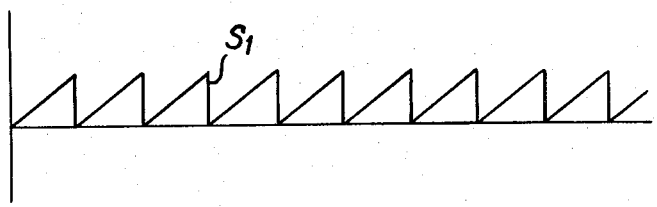
FIGS. 13A, 13B and 13C are waveform diagrams of signals produced at various locations in the drive circuit of FIG. 12.
Figure 13B:
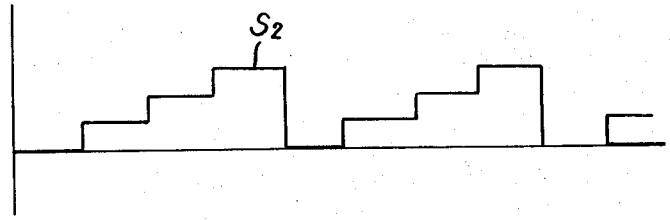
Figure 13C:
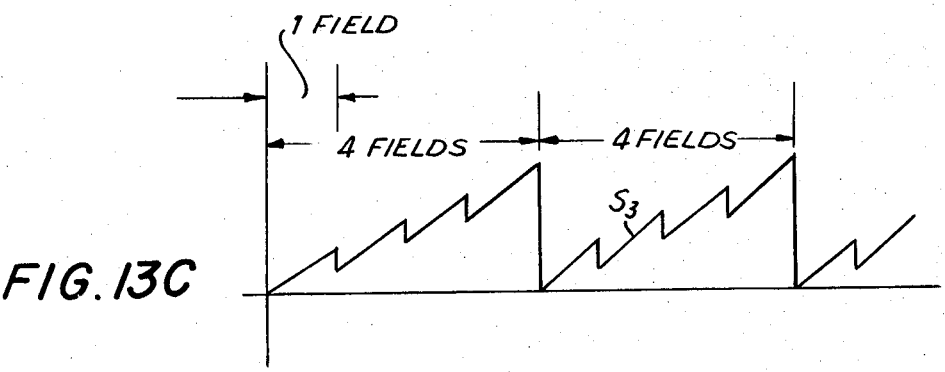

It will further be appreciated that the present invention may be employed in a two-headed, helical-scan VTR to permit the slow-motion or stop-motion reproducing of video signals which, as described above, have been recorded in adjacent parallel tracks by means of megnetic heads having different effective azimuth angles. More particularly, as shown on FIG. 12, the present invention may be advantageously applied to the mounting of the heads $H_a$ and $H_b$ in a helical scan VTR which is adapted to be operated in a so-called field slow-motion mode in which, for example, the speed at which the tape T is longitudinally driven by capstan 26 and pinch roller 27 on FIG. 1 is reduced to only one-quarter of the speed at which the tape is driven during the normal recording operation or a normal reproducing operation. In the illustrated circuit for controlling the operation of the VTR in the field slow-motion reproducing mode, pulse generators 49a and 49b are suitably associated with the rotary portion of the guide drum from which bi-morph leaves 30a and 30b extend so that pulse generators 49a and 49b produce head-position pulses as the heads $H_a$ and $H_b$ commence their respective scanning movements across the tape. Such pulses representing the rotational positions of heads $H_a$ and $H_b$ are 180° out of phase and are applied from generators 49a and 49b through an amplifier 50a and a delay device 51a, and through an amplifier 50b and a delay device 51b, respectively, to the input of a monostable-multivibrator 52 so that the latter provides a train of output pulses at the field frequency (60 Hz). Such pulses issuing from multivibrator 52 at the field frequency are applied to a sawtooth signal generator 53 which produces a sawtooth wave signal $S_1$ at the corresponding frequency, as shown on FIG. 13A. The output of multivibrator 52 is also applied to a step signal generator 54 and a counter 55 which acts as a divider. In other words, counter 55 counts the pulses from multivibrator 52 and, after every four pulses or four fields, provides a corresponding output which, therefore, has a frequency equal to one-fourth the field frequency. The step signal generator 54 is triggered by the output of multivibrator 52 so as to provide a stepped signal $S_2$ (FIG. 13B) which increases, in amplitude, for successive fields in response to the output of multivibrator 52, and which is reduced to zero or a predetermined reference level at every fourth field, that is, in response to each output from counter 55. The sawtooth signal $S_1$ from generator 53 and the stepped signal $S_2$ from generator 54 are applied to respective inputs of an adder 56 which, at its output, provides a combined signal $S_3$ (FIG. 13C). The combined signal $S_3$ is applied directly to a first input of an adder 45' and the signal $S_3$ is further applied through an inverter 47' to a first input of an adder 48'. The output of adder 45' is connected to electrodes 40a and 40b of bi-morph leaves 30a and 30b, respectively, while the output of adder 48' is applied to the electrodes 39a and 39b. It will be appreciated that the adders 45' and 48' and the inverter 47' on FIG. 12 generally correspond to the similarly numbered elements on FIG. 7, and that the signal $S_3$ from adder 56, in which the sawtooth signal $S_1$ is superposed or added to the step signal $S_2$, represents a special or particular form of the variable control voltage V derived from the source 44 on FIG. 7.

The adders 45' and 48' are also shown to have second inputs connected, in common, to a movable contact 57c of a change-over switch 57 which further has fixed contacts 57a and 57b selectively engageable by the movable contact. The fixed contacts 57a and 57b are shown to be connected through variable resistors 58a and 58b to sources 59a and 59b, respectively, of positive and negative D.C. voltage biases $+\Delta V$ and $-\Delta V$. Thus, when switch 57 is in the position illustrated on FIG. 12, the positive D.C. voltage bias $+\Delta V$ from source 59a is applied, after adjustment by means of the variable resistor 58a, to the second input of each of the adders 45' and 48' with the result that electrodes 40a and 40b have the control voltage $(S_3+\Delta V)$ applied thereto, while electrodes 39a and 39b have the control voltage $(-S_3+\Delta V)$ applied thereto.

As is usual, when recording the video signals in successive parallel tracks extending obliquely across the tape T, control signals $C_T$ (FIG. 3) are suitably recorded at spaced apart locations along a longitudinal edge of the tape so as to identify the locations of the tracks in which the video signals have been recorded, for example, so as to identify the locations of the tracks $T_a$, as on FIG. 3. In order to synchronize the longitudinal advancement or travel of tape T with the rotation of heads $H_a$ and $H_b$ in the field slow-motion reproducing mode, the circuit for controlling the operation of the VTR in that mode is further shown on FIG. 12 to include a fixed magnetic head 60 suitably disposed for reproducing the control signals $C_T$ recorded along an edge of the tape T, and an amplifier 61 and delay circuit 62 through which the reproduced control signals $S_c$ are applied to one input of a phase comparator 63. The comparator 63 has another input receiving the output of counter 55, and is operative to compare the phase of the output of counter 55 with the phase of the reproduced control signal $S_c$ so that, in response to a deviation therebetween, a suitable error or control signal is applied by comparator 63 to a capstan motor control circuit 64 by which the speed of rotation of capstan 26 is suitably controlled. More particularly, the illustrated circuit controls the speed of advancement or travel of tape T by capstan 26 so that heads $H_a$ and $H_b$ will scan the same one of the tracks $T_a$ or $T_b$ a repeated number of times, for example, four times, during the period required for advancement or travel of the tape through the longitudinal distance between adjacent control signals $C_T$.

During such repeated scanning of one of the tracks $T_a$ or $T_b$, the combined signals $S_3$ and $-S_3$ applied to electrodes 40a and 39a of bi-morph leaf 30a, and to electrodes 40b and 39b of bi-morph leaf 30b will cause progressive deflections of such bi-morph leaves in the directions perpendicular or normal to the plane of rotation of heads $H_a$ and $H_b$ so that such heads will accurately track or scan the track $T_a$ or $T_b$, notwithstanding the fact that the tape is being advanced at a substantially slower speed than was employed for recording signals in such record track $T_a$ or $T_b$. Simultaneously, the addition to the control signal $S_3$, and to its reversed polarity replica $-S_3$, of the D.C. voltage bias $+\Delta V$ from source 57a with switch 57 in the position shown on FIG. 12 serves to cause torsional flexing of bi-morph leaves 30a and 30b about their respective longitudinal medians in the directions to cause the effective azimuth angles of the heads $H_a$ and $H_b$ to correspond to the azimuth angle of the head with which signals were recorded in each of the tracks $T_a$. Conversely, if switch 57 is changed-over to engage its movable contact 57c with fixed contact 57b, the addition to control signal $S_3$, and to its reversed polarity replica $-S_3$, of the D.C. voltage bias $-\Delta V$ from source 59b causes torsional flexing of bi-morph leaves 30a and 30b in the opposite directions, that is, so as to make the effective azimuth angles of heads $H_a$ and $H_b$ correspond to the azimuth angle of the magnetic head with which signals were recorded in each of the tracks $T_b$.

Figure 12:
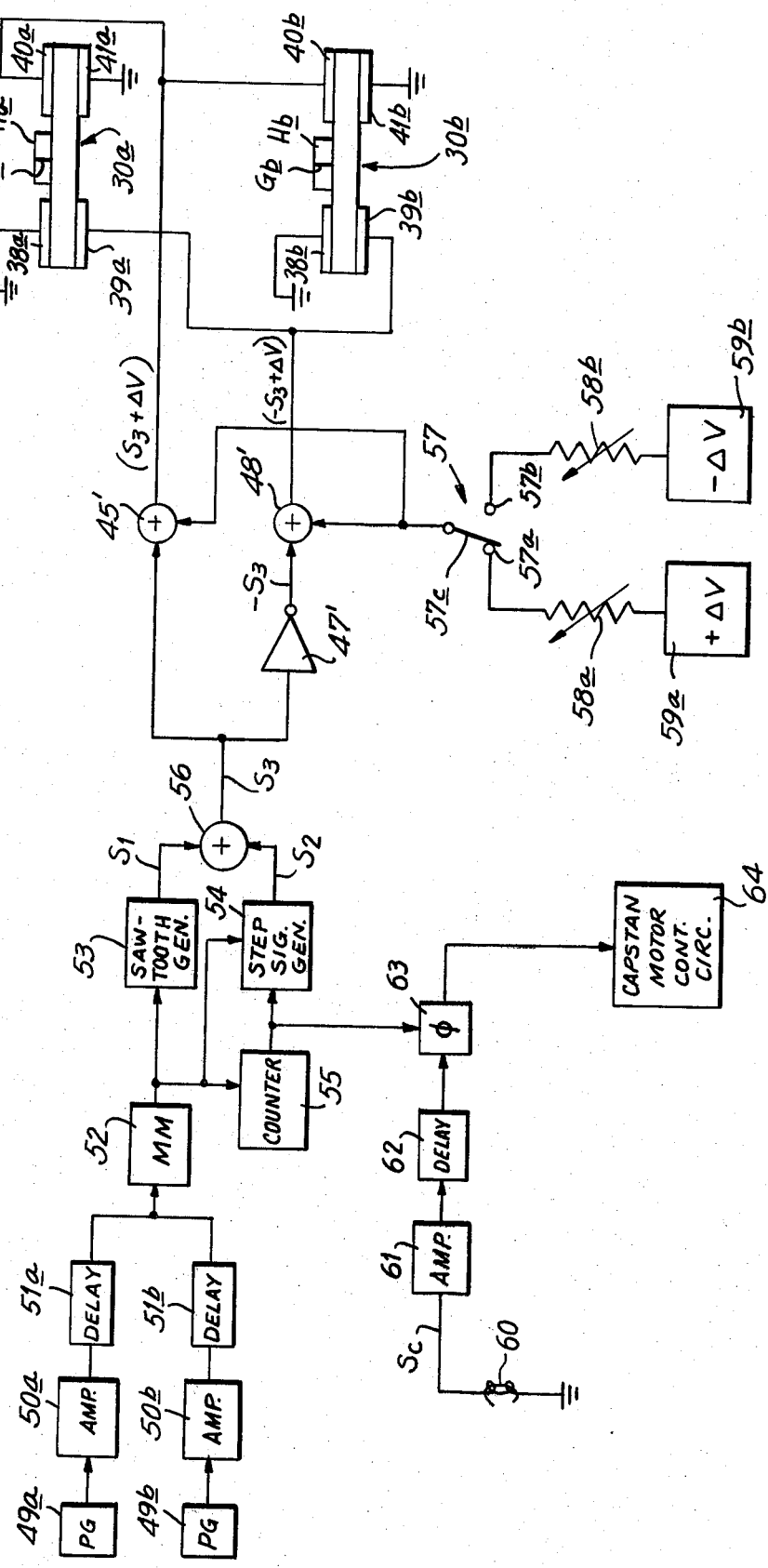
FIG. 12 is a block diagram of a drive circuit for providing control voltages to the piezo-electric supports of magnetic head assemblies embodying this invention during slow-motion reproducing operation of a VTR provided therewith.

When using a VTR with the control circuit shown on FIG. 12 for slow-motion reproducing of recorded video signals, the switch 57 is manually changed-over from one position to the other so as to determine which position provides a reproduced video picture of greatest clarity. In other words, with the illustrated circuit, the synchronization of the rotation of heads $H_a$ and $H_b$ with the longitudinal travel of the tape T may occur with both heads repeatedly by scanning either the successive tracks $T_a$ or the successive tracks $T_b$ and the described manual change-over of switch 57 ensures that the azimuth angles of the heads will be made to agree with the azimuth angle of the head with which signals were recorded in the tracks being scanned. Further, after the desirable position of switch 57 has been ascertained, the one of variable resistors 58a and 58b with which switch 57 is then connected can be adjusted to provide a fine control of the azimuth angle for achieving the sharpest possible reproduced picture.

Although the particular control circuit shown on FIG. 12 has been described with reference to a so-called field slow-motion reproducing mode in which both of the heads $H_a$ and $H_b$ repeatedly scan successive tracks $T_a$ or successive tracks $T_b$ while the tape is driven at a reduced speed, it will be appreciated that such control circuit can be easily adapted to a stop-motion reproducing mode, that is, a reproducing mode in which the heads repeatedly scan a single track while the tape is at rest. Moreover, a similar control circuit can be easily devised for the so-called frame slow-motion reproducing mode in which the head $H_a$ repeatedly scans the successive tracks $T_a$ and the head $H_b$ repeatedly scans the successive tracks $T_b$ during the relatively slow advancement of the tape.

In the magnetic head assembly according to the embodiment of the invention illustrated on FIGS. 5–7 the piezo-electric support member 30 is constituted by a single bi-morph leaf which has the pair of electrodes 38 and 39 and the pair of electrodes 40 and 41 spaced apart transversely on the major surfaces 36 and 37 of such bi-morph leaf. However, as shown on FIGS. 14 and 15, in a head assembly according to this invention, the piezo-electric support member 130 for the magnetic head H may generally comprise two elongated bi-morph leaves 130a and 130b extending parallel to each other and being transversely spaced apart, with the inner ends of such leaves 130a and 130b being cantilevered in a mounting bracket 131, and with the outer or free ends of bi-morph leaves 130a and 130b having a bridging member 65 extending therebetween and carrying the magnetic head H.

Figure 15:
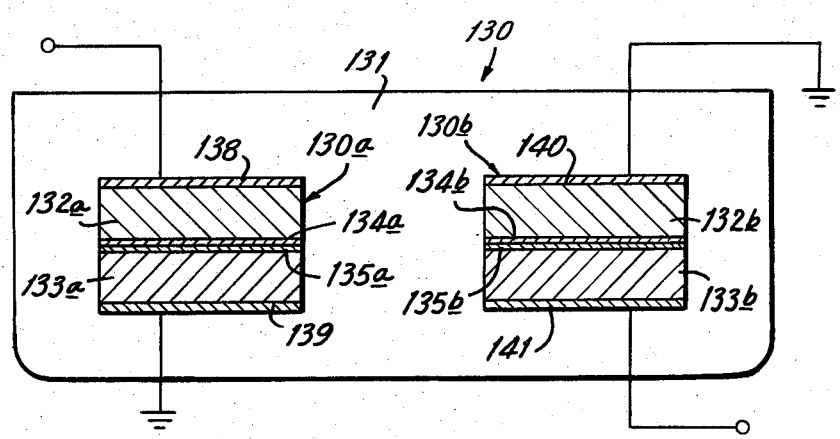
FIG. 15 is a transverse sectional view taken along the line 15—15 on FIG. 14.

As shown particularly on FIG. 15, the bi-morph leaf 130a may be composed of a pair of piezo-ceramic plates 132a and 133a which are generally elongated and provided on their confronting surfaces, with inner electrodes 134a and 135a, respectively, which are suitably bonded to each other. Similarly, the bi-morph leaf 130b is shown to be composed of a pair of piezo-ceramic plates 132b and 133b which are generally elongated and provided on their confronting surfaces, with inner electrodes 134b and 135b, respectively, which are suitably bonded to each other. Moreover, electrodes 138 and 139 which correspond to the previously described electrodes 38 and 39 are secured on the opposed or outer major surfaces of bi-morph leaf 130a, and electrodes 140 and 141 corresponding to the previously described electrodes 40 and 41 are secured on the opposed or outer major surfaces of bi-morph leaf 130b so as to be transversely spaced from the electrodes 138 and 139.

Figure 14:
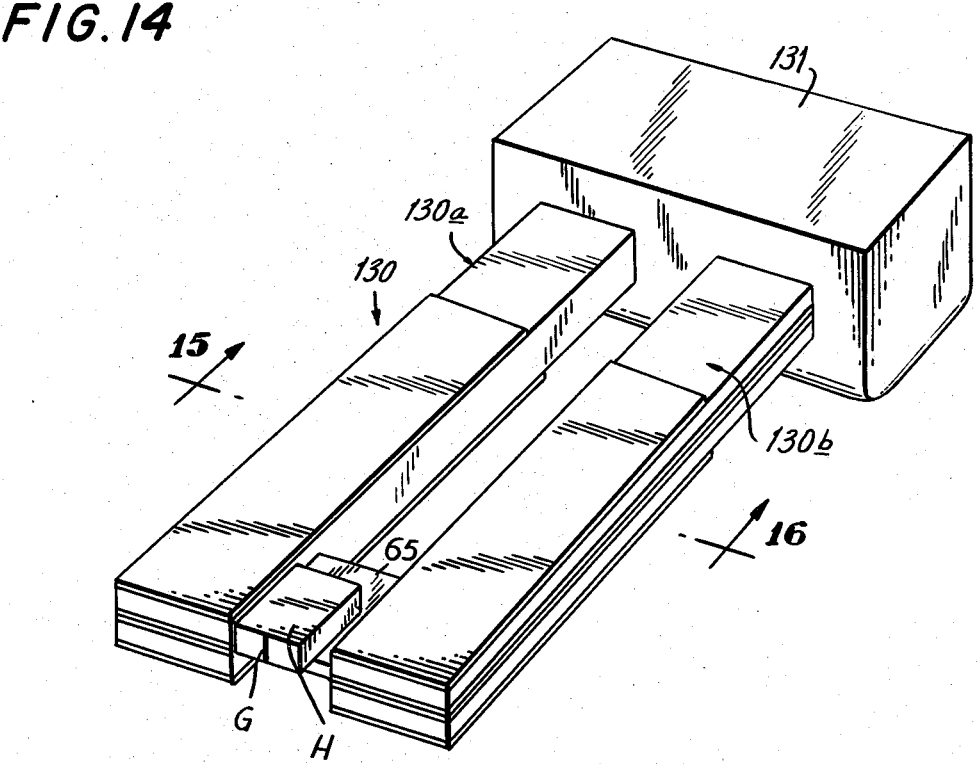
FIG. 14 is a perspective view similar to that of FIG. 6, but showing another embodiment of this invention.

It will be appreciated that, when electrodes 138–141 of head assembly 130 have control voltages applied thereto in a manner similar to that described above with reference to the electrodes 38–41 of head assembly 30, the head assembly described with reference to FIGS. 14 and 15 in similarly operative to provide selected deflections of the mounted head H in the direction perpendicular to its plane of rotation, and also to provide desired changes of the azimuth angle of the head.

Although the present invention has been described specifically above in its application to the slow-motion reproducing operation of a VTR having two heads which, in the recording mode, record the signals with different azimuth angles in adjacent tracks, it will be appreciated that the invention may also be applied to a VTR or similar recording and/or reproducing apparatus having a single rotary head which, in the recording mode, has its azimuth angle changed during successive scans of the tape, by means of the present invention, so as to again ensure that the signals are recorded in adjacent tracks with different azimuth angles. In the reproducing operation of such VTR with a single head, the present invention would be employed for changing the azimuth angle thereof during its successive scans of the tape so as to agree with the azimuth angle with which signals were recorded in each track being scanned.

It will be appreciated that the invention can also be advantageously applied to a VTR having a search mode of operation in which, for example, the tape is advanced or made to travel longitudinally at a speed far greater than, for example, ten times, the normal speed of travel for recording and normal reproducing operations. In such case, the scanning path of each head is at a very substantial angle in respect to the direction of the parallel tracks so that each head crosses a number of the record tracks while moving along its scanning path in the search mode. Thus, the present invention may be employed for alternately changing the azimuth angle of each head as the latter crosses the successive parallel tracks in which the signals were recorded with correspondingly different azimuth angles.

Finally, it is to be appreciated that, as previously described, each head provided in the VTR may have its gap simply extending at right angles across its effective face, that is, there is no need to provide the magnetic heads with gaps at special azimuth angles in order to achieve the recording of signals in the adjacent tracks with different azimuth angles. Moreover, there is no need to be particularly careful when mounting the heads so as to provide precisely the desired azimuth angle of its gap, as the effective azimuth angle may be established electrically during use, for example, by adjustment of the variable resistors 58a and 58b in FIG. 12.

Having described a number of illustrative embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. The combination of a magnetic head assembly comprising piezo-electric support means of elongated plate-like configuration having opposed major surfaces and being supported at one end, a magnetic head mounted on said support means adjacent the other end thereof, and pairs of first and second electrodes secured on said opposed major surfaces, respectively, and extending in the direction between said one and other ends of the support means with said pair of electrodes being parallel and spaced from each other in the direction transverse to said direction between the ends; and drive circuit means for applying selectively varied voltages across said first and second electrodes of said pairs and by which said piezo-electric support means is selectively made to flex for deflecting said head in a direction substantially normal to the plane of said plate-like support means and for varying the azimuth angle of said head, said drive circuit means including means connecting said first electrode of one of said pairs and said second electrode of the other of said pairs to ground, a source of a variable control voltage, means for providing a reversed polarity replica of said variable control voltage, means for providing each of said variable control voltage and said reversed polarity replica thereof with a selectively varied D.C. voltage bias, and means for applying said variable control voltage with said D.C. voltage bias and said reversed polarity replica with said D.C. voltage bias to said second and first electrodes, respectively, of said one pair and said other pair, respectively, of the electrodes.

2. The combination according to claim 1; in which said piezo-electric support means includes a bi-morph leaf having said pairs of first and second electrodes spaced apart on the opposite surfaces thereof.

3. The combination according to claim 1; in which said piezo-electric support means includes first and second bi-morph leaves respectively having said pairs of electrodes thereon and being spaced from each other in said transverse direction, and a bridging member extending between said first and second bi-morph leaves at said other end and carrying said magnetic head.

4. The combination according to claim 1; in which said magnetic head has a gap opening away from said piezo-electric support means in said direction between the ends so that said azimuth angle is varied upon torsional flexing of said support means about the longitudinal axis of the latter.

5. An apparatus for reproducing information signals recorded in a track extending obliquely on a magnetic tape and being preceded and followed by similar tracks which are parallel thereto and also have information signals recorded therein, with the tracks which are adjacent each other having the information signals recorded therein with magnetic domains at different angles in respect to the direction along the tracks; comprising a guide drum having said tape extending helically about at least a portion thereof while the tape is adapted to be longitudinally advanced, at least a portion of said drum being rotatable, a magnetic head adapted to scan along one of said tracks for reproducing the information signals recorded therein; head mounting means including piezo-electric means of elongated, plate-like configuration having opposed major surfaces with said head mounted at one end and the other end being cantilevered from said rotatable drum portion to rotate with the latter for causing said head to scan along the one of said tracks positioned in proximity thereto by advancement of the tape with torsional flexing of said piezo-electric means about its longitudinal median varying the azimuth angle of said head in respect to said track while longitudinal bending of said piezo-electric means is effective to deflect said head in a direction transverse to the length of the track, and pairs of first and second electrodes secured on said opposed major surfaces of the piezo-electric means and extending parallel to said longitudinal median with said first and second electrodes of one of said pairs being spaced laterally from said first and second electrodes, respectively, of the other of said pairs; and drive circuit means for applying selectively varied voltages across said first and second electrodes of said one pair and of said other pair, respectively, and thereby determining the position of said head both in respect to its azimuth angle and the deflection of the head in said transverse direction relative to said track, said drive circuit means including means connecting said first electrode of one of said pairs and said second electrode of the other of said pairs to ground, a source of a variable control voltage, means for providing a reversed polarity replica of said variable control voltage, means for providing each of said variable control voltage and said reversed polarity replica thereof with a selectively varied D.C. voltage bias, means for applying said variable control voltage with said D.C. voltage bias and said reversed polarity replica with said D.C. voltage bias to said second and first electrodes, respectively, of said one pair and said other pair, respectively, of the electrodes, means for determining said variable control voltage in dependence on the rotation of said head with said rotatable drum portion, and means for determining said D.C. voltage bias in dependence on the track being scanned by said head so as to make the azimuth angle of the latter correspond to the angle in respect to the direction along the scanned track of the magnetic domains with which the information signals are recorded in said scanned track.

6. An apparatus according to claim 5; wherein said piezo-electric means includes a bi-morph leaf.

7. An apparatus according to claim 5; wherein said piezo-electric means includes first and second bi-morph leaves having said pairs of electrodes respectively secured thereon and being spaced from each other in said lateral direction, and said head mounting means further includes a bridging member extending between said first and second bi-morph leaves at said one end and carrying said magnetic head.

8. An apparatus according to claim 5; in which slow motion reproduction of the recorded information signals is effected by longitudinally advancing the record medium at a speed slower than that at which the record medium is advanced during recording of the information signals so as to cause repeated scanning of said tracks; and in which said means for determining the variable control voltage includes sawtooth signal generating means providing a sawtooth voltage signal with a period substantially equal to the time required for each scan along one of said tracks by said head, step signal generating means providing a step voltage signal which increases stepwise for each scan along a particular track and then returns to an original value upon commencement of scanning of the next track, and means for combining said sawtooth voltage signal with said step voltage signal to provide said variable control voltage.

9. In an apparatus of the type wherein signal information is recorded on a magnetic record medium in successive parallel tracks which are skewed with respect to a direction of travel of the record medium, said apparatus having a plurality of alternately operative magnetic heads which scan along said successive parallel tracks in order for the recording and normal reproducing of the signal information therein during travel of the record medium at a normal speed, with said magnetic heads having gaps at different azimuth angles, respectively, during recording, so that the signal information is recorded in adjacent tracks with magnetic domains at correspondingly different angles to the direction along the tracks, and in which slow motion reproducing of the recorded signal information is effected by causing said record medium to travel at a reduced speed with the result the tracks are scanned repeatedly by said heads; the improvement comprising head mounting means including, for each of said heads, piezo-electric means of elongated, plate-like configuration having opposed major surfaces with the respective head mounted at one end and the other end being cantilevered so that torsional flexing of said piezo-electric means about its longitudinal median varies the azimuth angle of the respective head in respect to the track being scanned thereby while longitudinal bending of said piezo-electric means is effective to deflect said respective head in a direction transverse to the length of the track being scanned, and pairs of first and second electrodes secured on said opposed major surfaces of the piezo-electric means and extending parallel to said longitudinal median with said first and second electrodes of one of said pairs being spaced laterally from the first and second electrodes, respectively, of the other of said pairs; and drive circuit means operative during said slow motion reproducing for applying selectively varied voltages across said first and second electrodes of said one pair and of said other pair, respectively, of each of said piezo-electric means so that the respective head, in scanning along one of said tracks, is deflected in said transverse direction for accurate scanning and has its azimuth angle determined to correspond to the angle of the magnetic domains recorded in said one track being scanned, said drive circuit means including, for each of the heads, means connecting said first electrode of one of said pairs and said second electrode of the other of said pairs to ground, a source of a variable control voltage, means for providing a reversed polarity replica of said variable control voltage, means for providing each of said variable control voltage and said reversed polarity replica thereof with a selectively varied D.C. voltage bias, means for applying said variable control voltage with said D.C. voltage bias and said reversed polarity replica with said D.C. voltage bias to said second and first electrodes, respectively, of said one pair and said other pair, respectively, of the electrodes on said piezo-electric means for each head, means for determining said variable control voltage in dependence on the rate of scanning movement of each said head, and means for determining said D.C. voltage bias in dependence on the track being scanned so as to make the azimuth angle of the head scanning such track correspond to the angle in respect to the direction along the scanned track of the magnetic domains with which the information signals are recorded in said scanned track.

10. An apparatus according to claim 9; wherein each said piezo-electric means includes a bi-morph leaf.

11. An apparatus according to claim 9; wherein each said piezo-electric means includes first and second bi-morph leaves having said pairs of electrodes respectively secured thereon and being spaced from each other in said lateral direction, and said head mounting means further includes, for each said head, a bridging member extending between said first and second bi-morph leaves at said one end and carrying said respective magnetic head.

12. An apparatus according to claim 9; in which said means for determining the variable control voltage includes sawtooth signal generating means providing a sawtooth voltage signal with a period substantially equal to the time required for each scan along one of said tracks by one of said heads, step signal generating means providing a step voltage signal which increases stepwise for each scan along a particular track and then returns to an original value upon commencement of scanning of the next track, and means for combining said sawtooth voltage signal with said step voltage signal to provide said variable control voltage.

* * * * *